Sept. 27, 1927.
J. F. MULLANEY
1,643,392
MOLDING MACHINE
Filed Sept. 17, 1923      10 Sheets-Sheet 4
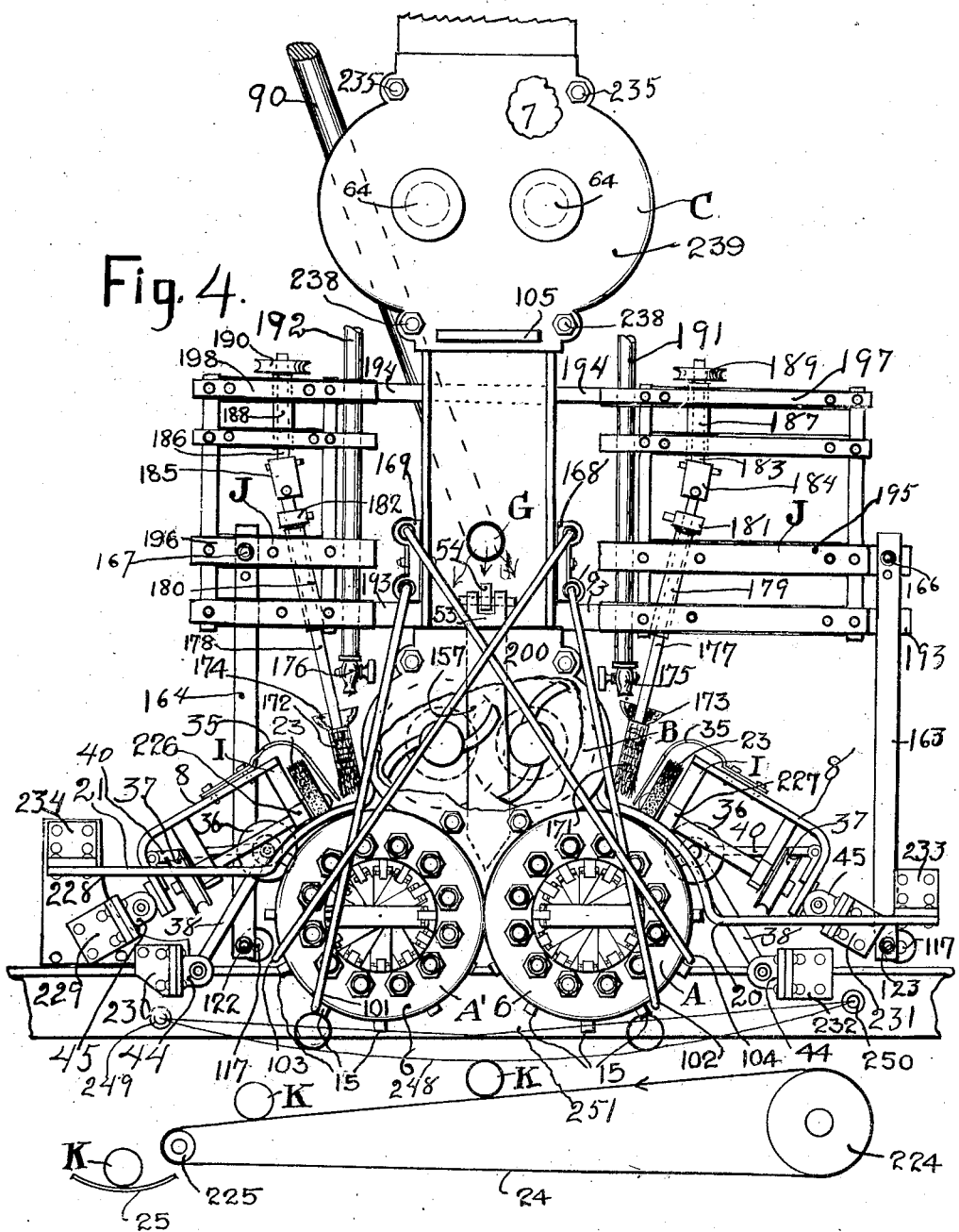
INVENTOR
John F. Mullaney
BY John F. Mullaney
ATTORNEY

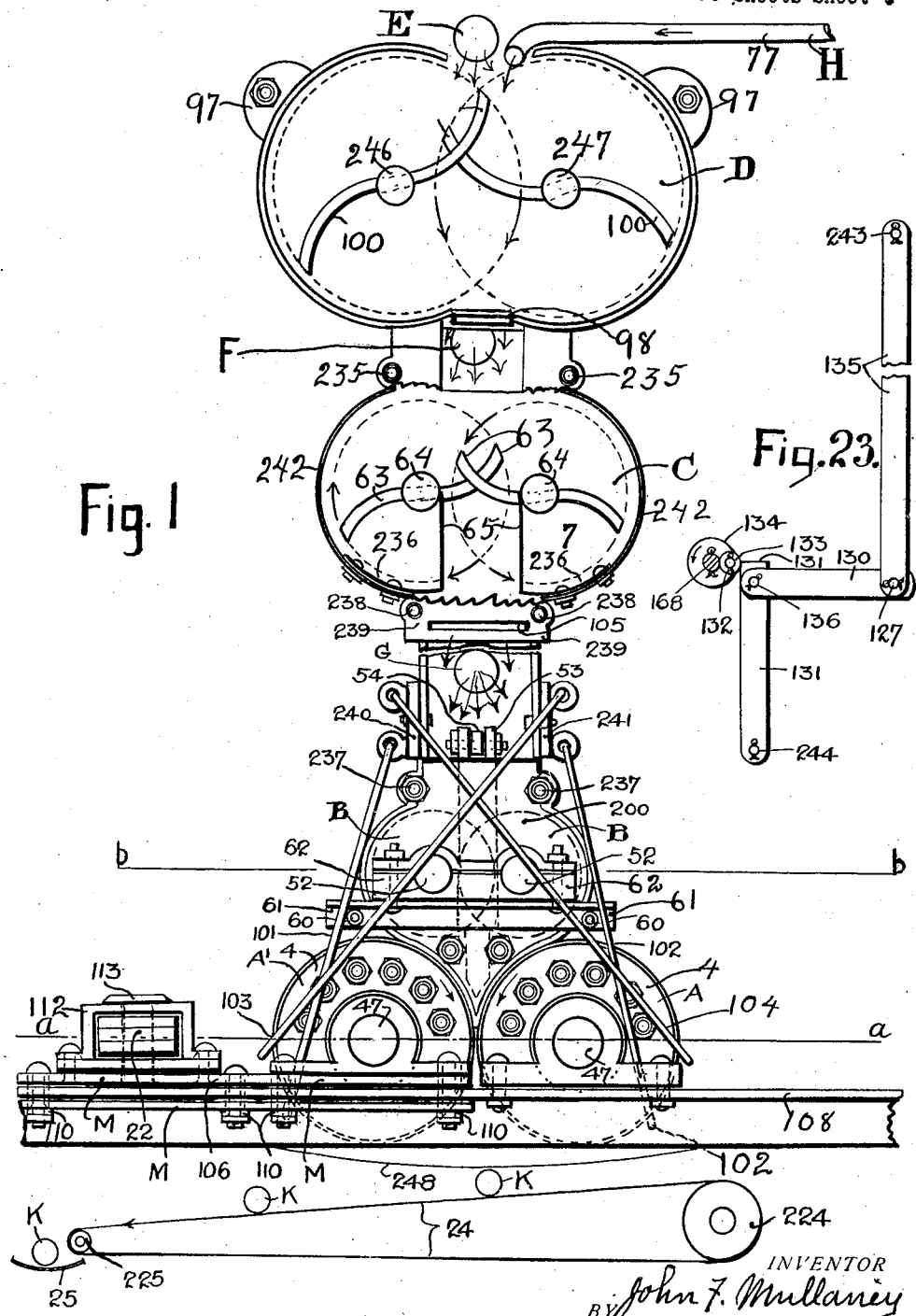

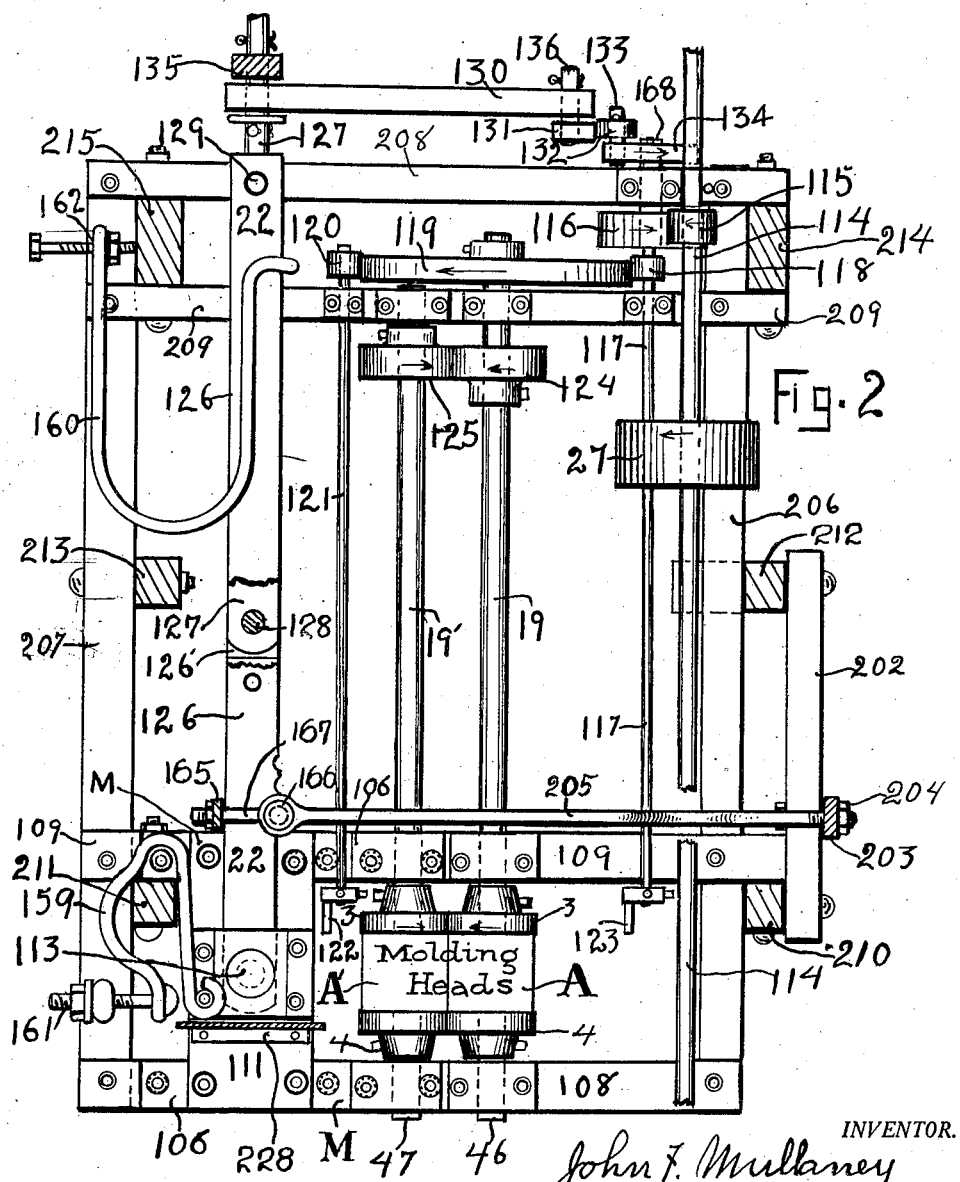

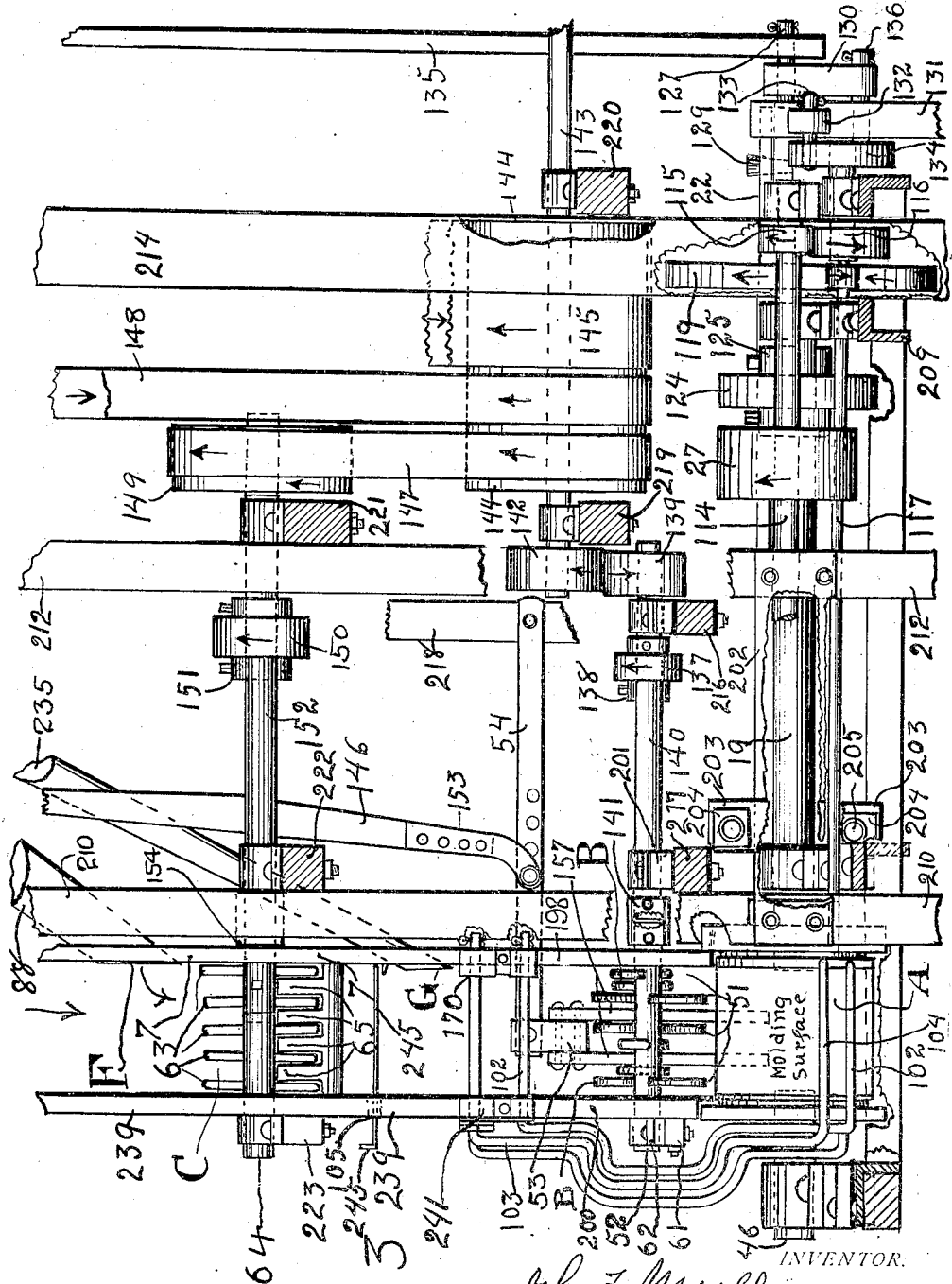

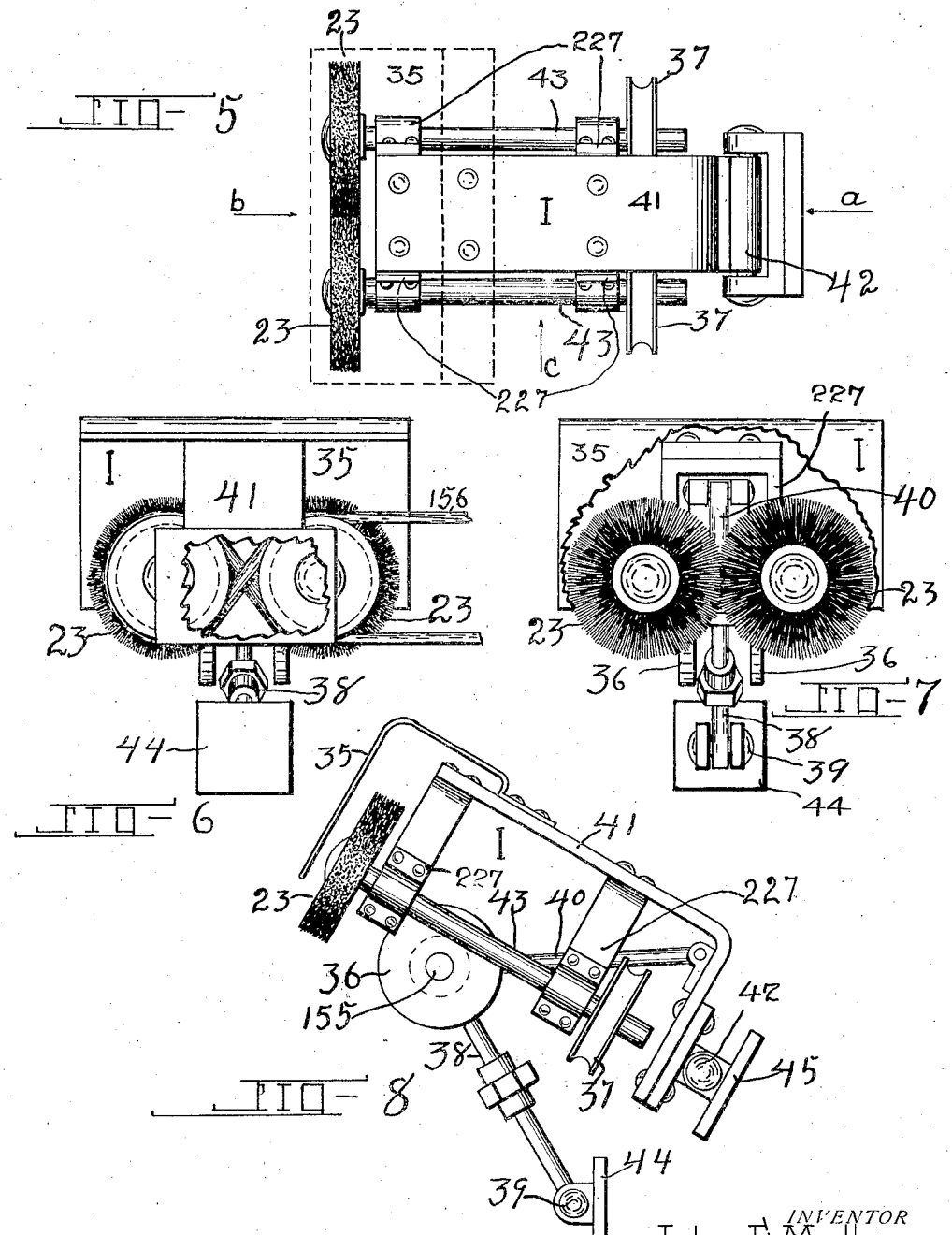

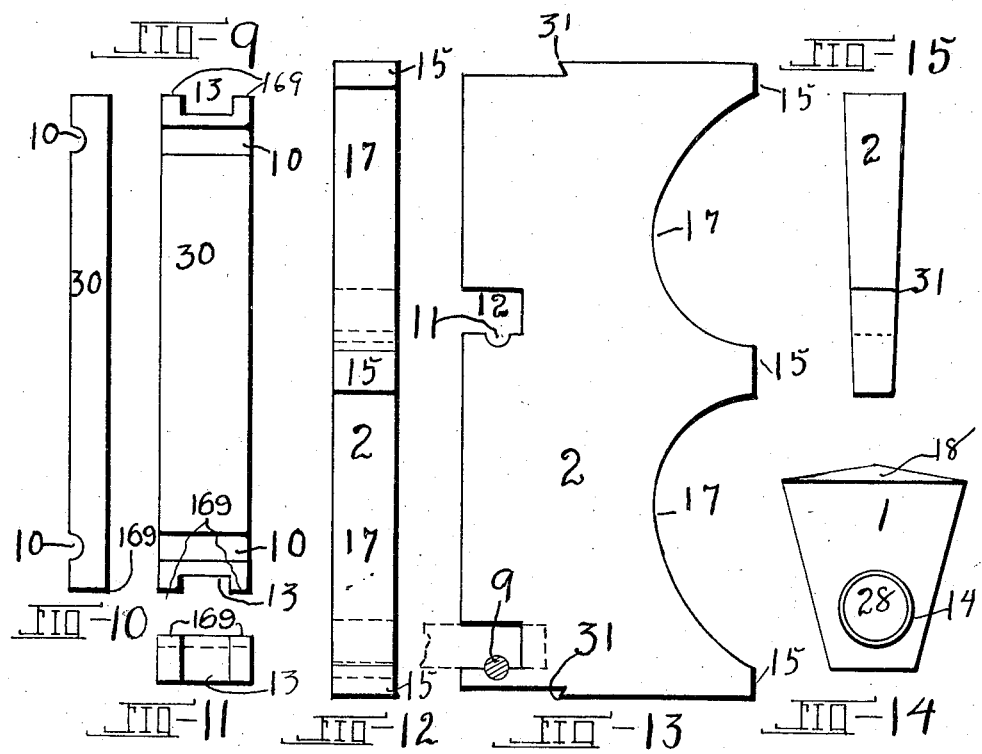
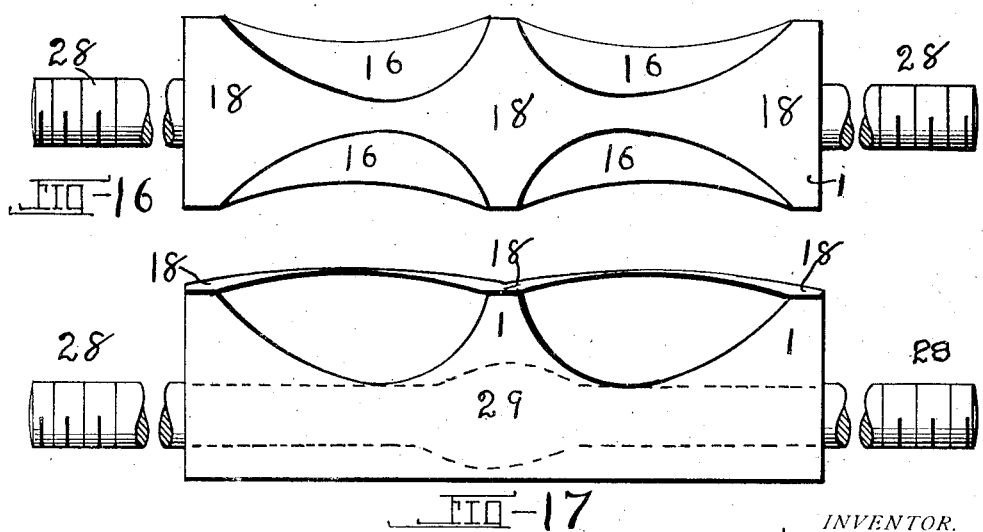

Sept. 27, 1927.
J. F. MULLANEY
1,643,392
MOLDING MACHINE
Filed Sept. 17, 1923
10 Sheets-Sheet 7
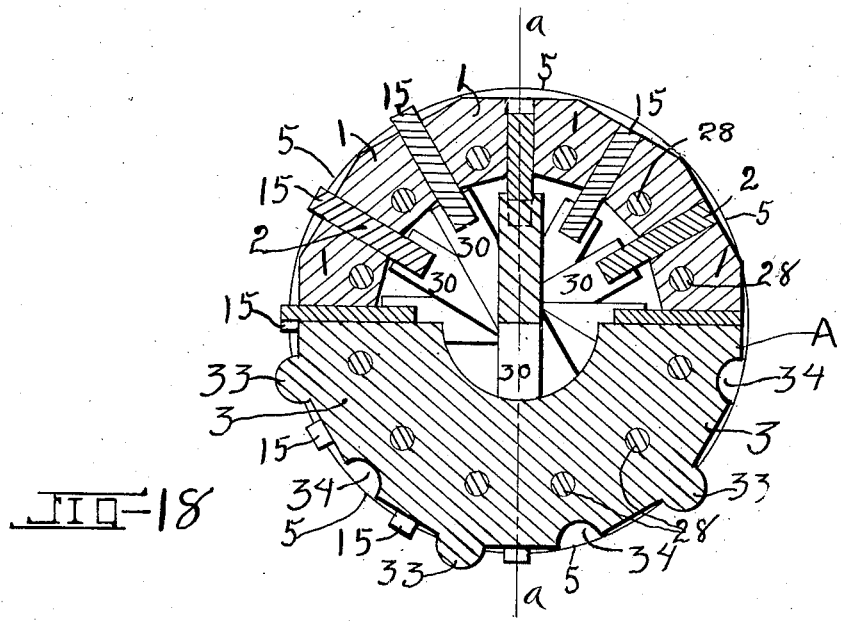
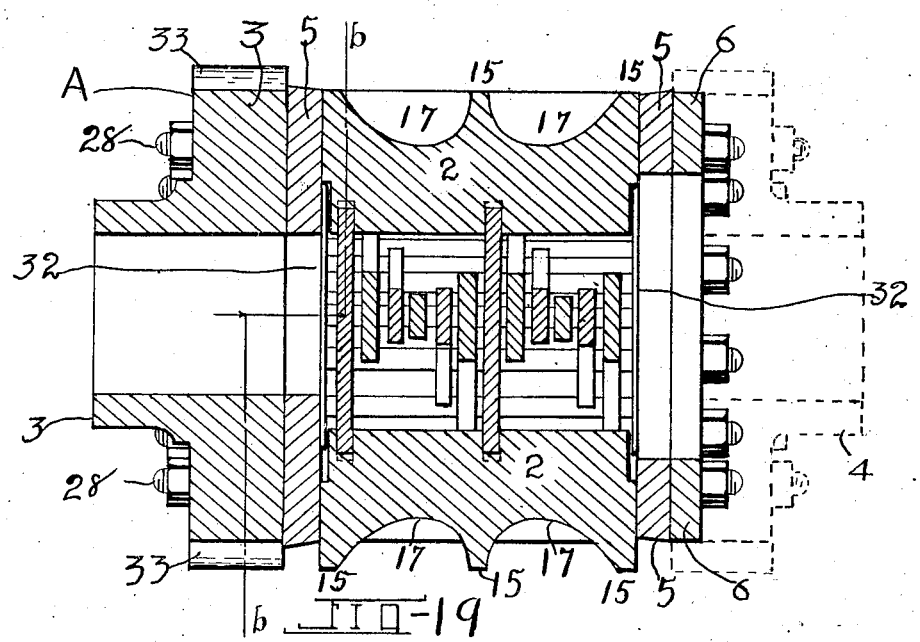
INVENTOR.
JOHN F. MULLANEY
BY John F. Mullaney
ATTORNEY

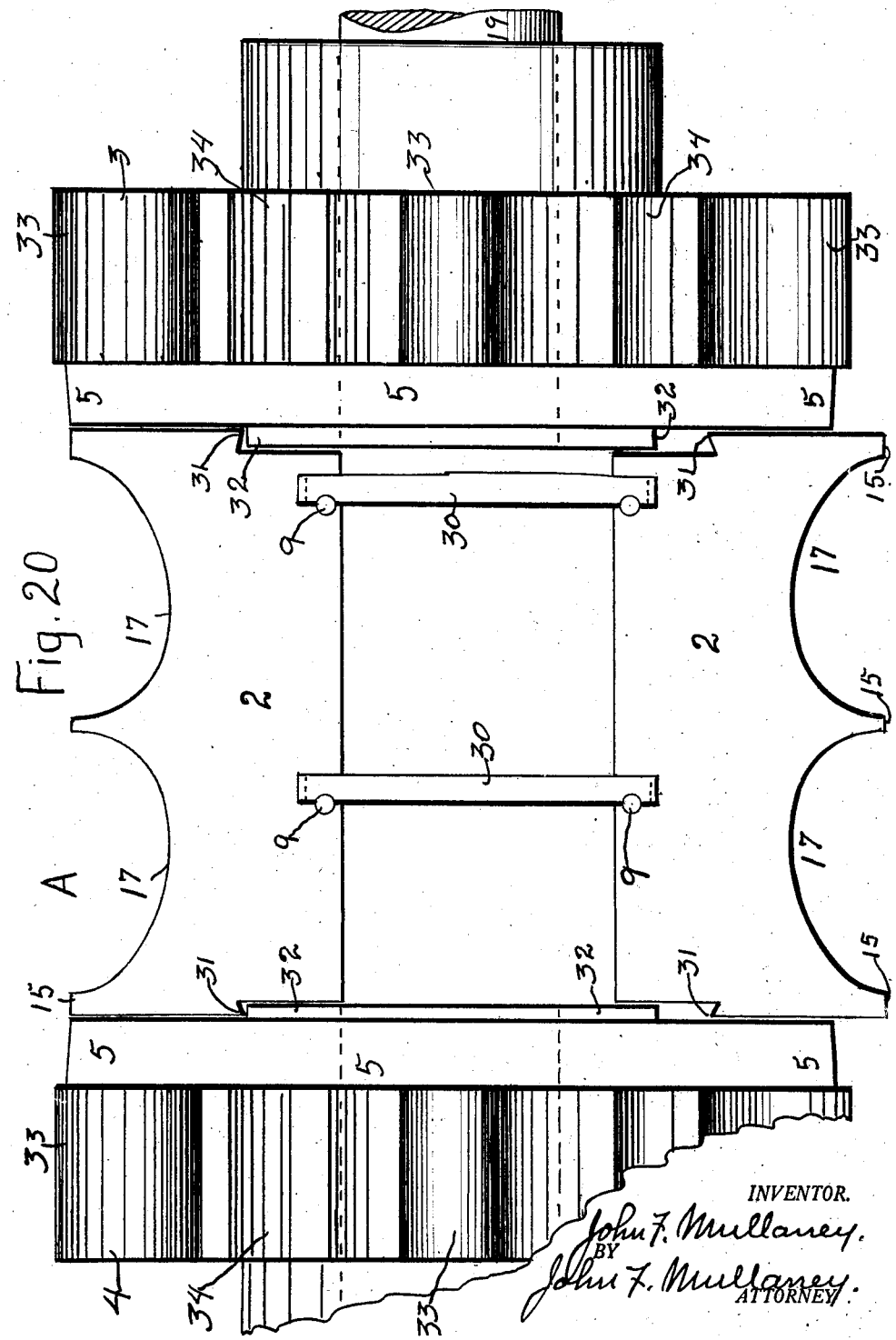

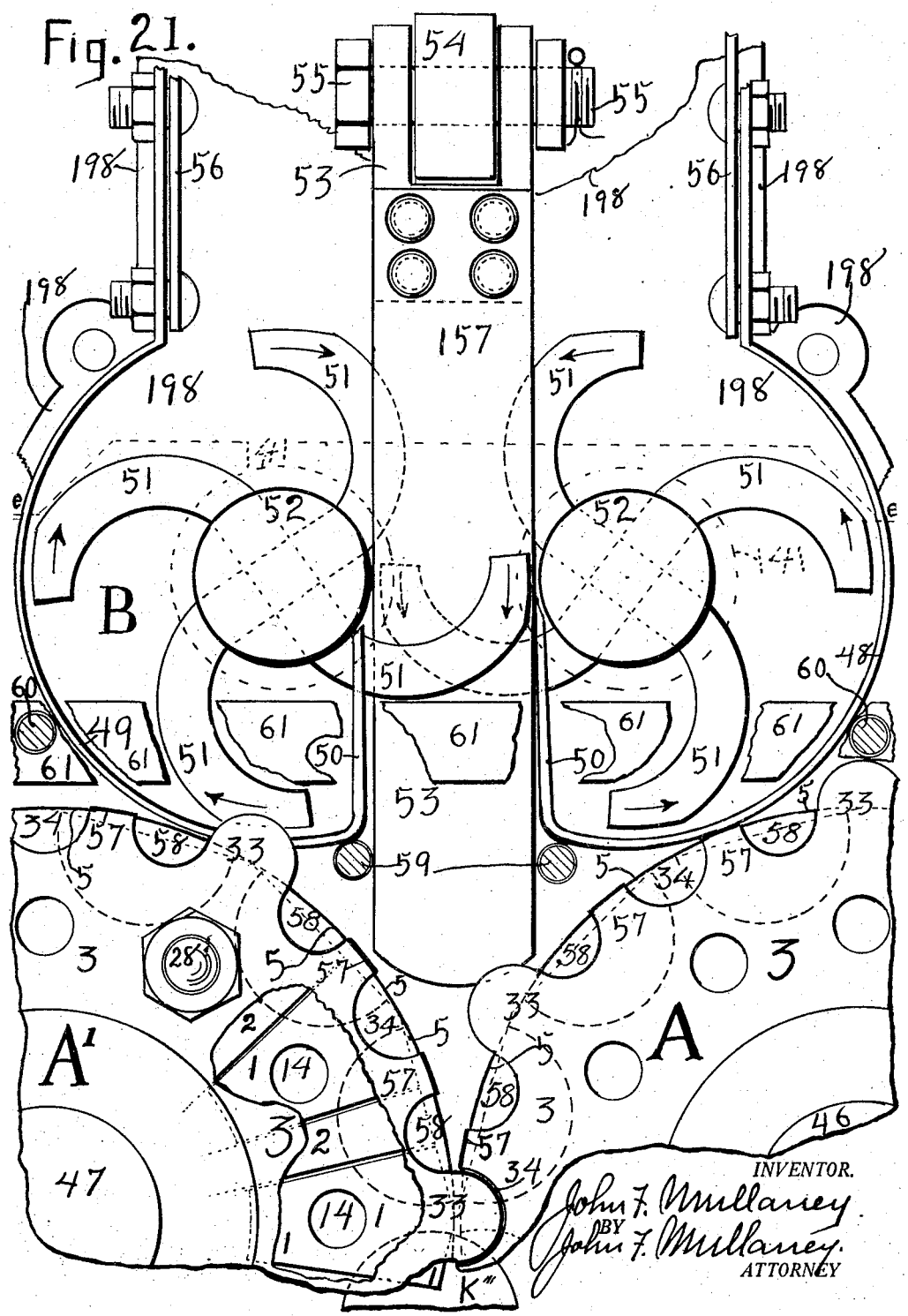

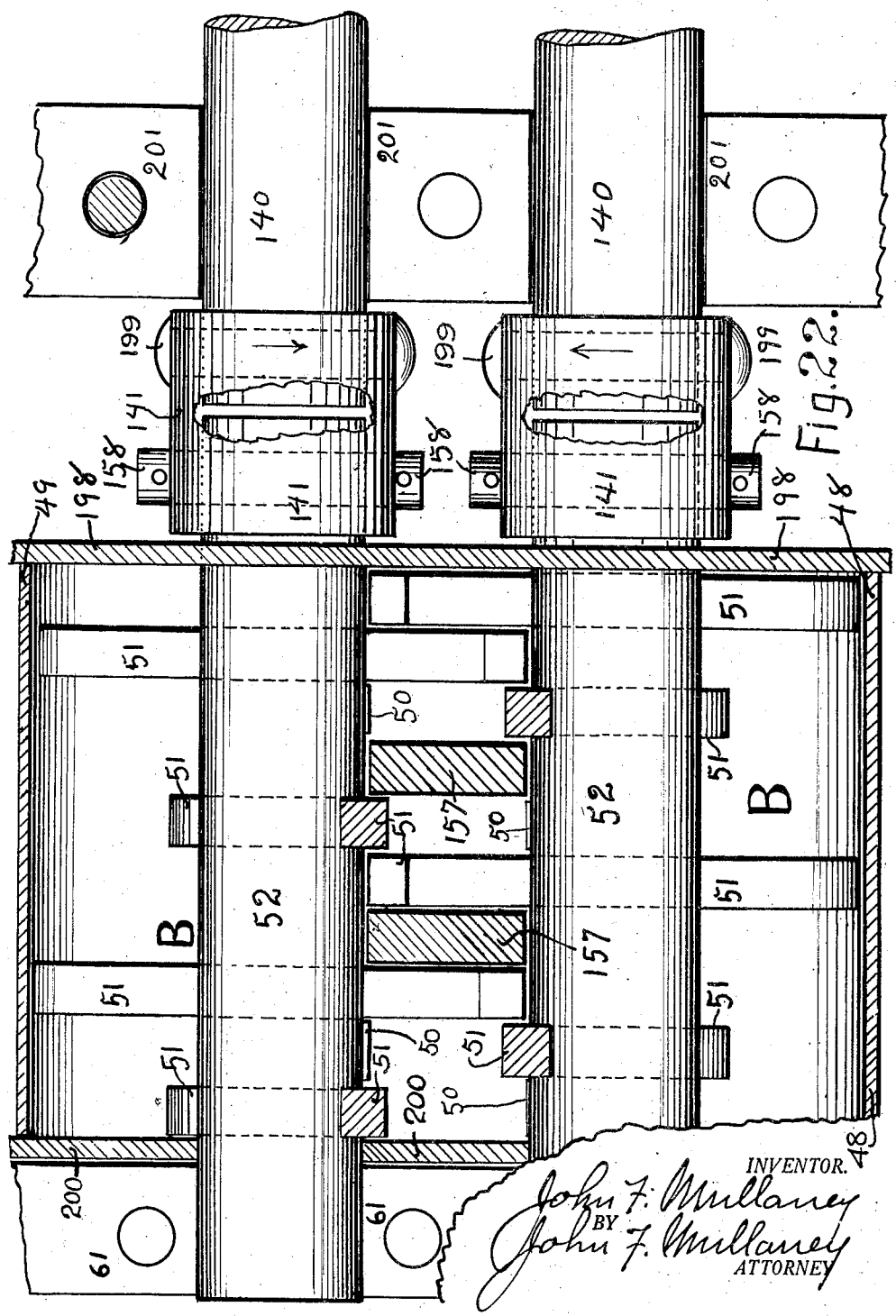

Patented Sept. 27, 1927.

1,643,392

UNITED STATES PATENT OFFICE.

JOHN F. MULLANEY, OF COLORADO SPRINGS, COLORADO.

MOLDING MACHINE.

Application filed September 17, 1923. Serial No. 663,088.

My invention relates to improvements in molding machines adapted for forming plastic material, as damp clays and other soft or pulverized earthy matters, to be formed by a powerful compression, as in forming plastics of clay and sand, and in which it is necessary to have the molds composed of a multiplicity of separate pieces forming the molded articles so arranged as to be taken apart from the molded article by removing one or more pieces of the mold at a time, so as not to disturb the form of the article molded; and some of the objects of my improvements are; first, to provide a rapid means of forming plastic material into the desired molded form; second, to provide molding means consisting of rotatable molding heads in cylindrical form adapted to receive the material and mold it into the desired shape and to expel the article molded from the molding heads without defacing or marring the surface of the article molded; third, to provide a series of automatically operated plungers in each of the said heads provided and adapted to expel from the molds the article molded; fourth, to provide means for automatically and mechanically operating a multiplicity of plungers separate in the same head, for the expulsion of the molded article;

Fifth, for providing means for automatically and mechanically operating a plurality of plungers in twin heads, so that the plungers utilized in forming a certain mold between two drums, shall be operated so that one shall start the expulsion of the mold from one head before its opposite plunger starts the expulsion from its corresponding registering part of the mold, by means of its registering plunger; sixth, to provide means for securing said molding heads to the shaftings carrying hub-shaped ends for said heads adapted to receive stud-bars forming the staves or frame of the twin heads comprising the principal body of the molding heads; seventh, to provide adjustably secured cams adapted to operate the plungers in the molding heads, for the purpose of expelling the molded articles of earthy matter from the molding heads; eighth, to provide means for automatically lowering or setting the molds in the rotating molding heads before the material to be molded is injected into them; ninth, to provide means for holding rotating molding heads in their registering positions at the bottom of the hopper; tenth, to provide means in the bottom part of a hopper adapted to supply plastic earthy matter to the molding heads, whereby the earthy matter may be supplied to the molding heads; eleventh, to provide means for adjustably operating the comparative speed of molding drums with the comparative speed of a mixing appliance above the molding heads, so that said mixing appliance may be readily caused to turn slower or to stop without changing the speed of the molding heads; twelfth, to provide means in connection with a molding machine for mixing the materials to be molded so as to have a greater or less proportion of moisture and without changing the speed of the rest of the machinery on the molding machine;

Thirteenth, to provide a pair of molding heads containing surfaces of duplicate uniform stud-bars and plungers having plurality resistance surfaces in each head adapted to form a part of the surface of the article to be molded from damp material and said stud-bars having cast within them, stud-bolts having thread lugs or bosses adapted to provide adjustment for said stud-bars; fourteenth, to provide a molding machine especially applicable to molding nest eggs from earthy matter; fifteenth, to provide a rotary molding machine in combination especially applicable to molding bricks and briquettes; sixteenth, to provide a molding machine that will mix with earthy matter foreign articles, as fibrous substances and wood pulp or sawdust so as to form rigid articles of manufacture and to expel them from the molds without defacing them; seventeenth, to provide automatic co-operative mechanical means for pulverizing the required material and mixing it in proper manner and proper proportions dry, and to then mix it with water, and later to add and remix more dry material to stiffen it and later to mold it into forms and convey it through a dehydrating appliance as a finished article; eighteenth, to provide the following described machinery for pulverizing, mixing, and drying, articles manufactured from moistened earthy matters with a binder ingredient as fibrous and sticky matters; nineteenth, in the manufacture of molded articles from semiplastic mixed materials having a binding ingredient or ingredients, as linters or sticky chemicals or both, a machine for mixing the materials gradually and molding and drying them in a continuous manufacturing mechanical succession.

I attain these objects by means of the mechanism illustrated in the accompanying drawings, in which—

Figure 1, is a front diagrammatic elevation of the molding machine and three mixers;

Fig. 2, is a plan view of the molding machine on the line a—a of Fig. 1;

Fig. 3, is a right side elevation of part of the molding machine from the frame K upwardly;

Fig. 4, is a diagrammatic front elevation of the molding machine on a larger scale than Fig. 1, and also showing the cleaners I and the oilers J;

Fig. 5, is a detail plan view of the cleaners I;

Fig. 6, is a rear elevation of Fig. 5, looking in the direction of the arrow a;

Fig. 7, is a front elevation of Fig. 5, looking in the direction of the arrow b;

Fig. 8, is a side elevation of the Fig. 5, looking in the direction of the arrow c;

Fig. 9, is a detailed plan view of one of the connecting bars to connect a pair of the plungers in the molding heads A—A';

Fig. 10, is an edge view of Fig. 9;

Fig. 11, is an end view of Fig. 9;

Fig. 12, is an outer edge view of Fig. 13;

Fig. 13, is a plan view of one of the plungers 2 that forms part of the surface of the mold and ejects the molded article from the molding head A;

Fig. 14, is an end view of one of the stud bars 1;

Fig. 15, is an end view of Fig. 13;

Fig. 16, is a face plan view of one of the stud bars 1, showing the parts of four molds;

Fig. 17, is a side elevation of Fig. 16;

Fig. 18, is a sectional elevation of Fig. 19, on the line b—b;

Fig. 19, is a sectional plan view of one of the molding heads A, showing an outer hub 4 in dotted lines;

Fig. 20, is a diagrammatic view of a plan of the two hubs 3 and 4 and two of the plungers 2, connected by the two connection bars 5;

Fig. 21, is a diagrammatic elevation of the front of the lower mixers B, and part of the molding-heads A and A';

Fig. 22, is a diagrammatic plan view in detail of the mixing appliances in B, on the line e—e, Fig. 21;

Fig. 23, is a diagrammatic rear elevation of the cam and pitman mechanism actuating compression lever 22, by means of intermediate lever 127.

*Index to particular groups of parts.*

A, is the right-hand molding-head;
A', is the left-hand molding-head;
B, are the lower rotary mixers next to the molding-heads;
C, are the rotary mixers next above the mixers B;
D, are the mixers of the water and dry matter and are the first set of rotary mixers;
E, is the supply means of dry material for the mixers D;
F, is the supply means for the dry material for C;
G, is the supply means for the dry material for the mixers B;
H, is the means for water or fluid supply;
I, are the rotary cleaning brushes to clean the molds;
J, are the frames of the oiling appliances to oil the surfaces of the molds after each cleaning by I;
K', K'', K''', are the representation of molded articles as nest-eggs or briquettes, in Fig. 21;
K, is the representative of a molded article in transit;
L, is the weight lever appliance for shutting off the water;
M, is the carriage member carrying the left hand molding head A';
X, is the representation for the actuating pulley for conveyor 70;
XX, is the symbol for the actuating pulley for conveyor screw 71;
XXX, is the symbol for the actuating pulley for conveyor screw 72;

Similar numerals and similar letters and characters refer to similar parts throughout the several views.

The two molding heads A, A' and the super-positioned mixers constitute the primary mechanical part of my invention, and the other numerous auxiliary parts are the required members for the effective operation that is required to produce the desired effects as set forth in my objects cited hereintofore.

The construction of the two molding heads A, A' is similar and is illustrated in Figures 9, 10, 11, 12, 13, 14, 15, 16, 17, 19, and 18, in detail of parts and construction. While Fig. 19, shows a molding head provided to extend outwardly from a shaft with a bearing at but one end of the head, which is one of the forms of present construction, I have shown by dotted lines an additional hub 4, to the right of the figure constructed therewith to designate the construction shown for an outer bearing as well as an inner bearing; which is the construction herein described.

The molding heads A, A' are provided each with 12 stud bars 1, and with 12 plungers 2, positioned alternately and forming the forms for the molding of nest eggs of clay-like moist matter composed of clay and water and fibrous binding material as cotton or linters. The plungers 2, 2 operate between their respective stud bars 1, 1 and form the extreme longitudinal boundary of the egg. My machine may be constructed so that the molds may form other articles beside nest eggs, but my description herein will be confined to forming nest eggs. My construction may cover a molding head with but one hub 3, but the construction herein described will have the two hubs 3 and 4 for each molding head, A and A'.

The drawings and description omit the power-supplying line shafts, as I do not claim invention in them and they are varied by the power-supply means, though we prefer electric motors connected by friction clutches for each distinct member of the mechanism.

Sheets 6 and 7, having Figures 9 to 19 inclusive show the parts of the molding heads separated and assembled. Figs. 9 and 10 show the side view and edge view, respectively of one of the connecting bars 30, of which there are 12 in each head and which connect the 12 plungers 2, in six pairs of two each, on opposite sides of the head. These connecting bars 30, pass each other, as shown in Figs. 18 and 19, extending through the diametric center of the head and secure the connected opposite plungers 2, 2 so that when one is depressed so that its projecting prongs 15 are flush with the outer surface 18 of the adjacent stud bars 1, the opposite plunger 2 secured thereto by its connecting bars 30, will project so that its three projecting prongs 15, will extend about a half inch beyond the outer surface 18 of its adjacent stud bars 1 and its concave molding surfaces 17, 17 will extend beyond the concave molding surfaces 16, 16 of the stud bars.

Fig. 9, shows a flat face view of the connecting bar 30, with the groove seat recess 10 provided to register with the seat recess 11 of the angular recess 12, of the plunger 2, Fig. 13, to receive the rivet key 9. This key 9 locks the connecting bar 30 to the plunger 2, and the projecting lugs 169, 169 at the ends of the connecting bars 30, enclasp the sides of the plungers 2 and prevent a careening motion from deflecting the plungers from a direct line extending toward the parallel direction of the connecting bars. The notch 13 between the projecting lugs 169 receives the edge of the plunger at the bottom of the recess 12.

The stud bar 1, is traversed longitudinally by the stud bolt 28, shown in Fig. 17, and many other figures, and is shown at 29 to be swelled so that it will not slip in the stud bar 1, which is preferably cast about the stud bolt in the form of the construction shown herein, tho the holes may be drilled through the stud bars and the stud bolts put through in uniform size and keyed.

The depressions 17, 17 in the outer faces of the stud bars 1 are provided for the escape of egg material that is in excess of what can enter the molds as the molding heads A, A' are forced together.

In Fig. 13, is shown on the plunger 2 the beveled offsets 31, provided to engage the annular flange 32 shown in Figs. 19, and 20. In Fig. 20, sheet 8, a good display is illustrated of the oscillating positions of a pair of the plungers between the hubs 3 and 4, and it also shows a detailed view of the annular beveled flanges 5, 5, on the inner surface of the hubs 3 and 4, and provided to slide against the edges of the faceplates 198 and 200, shown in Fig. 3, Fig. 1, and against the faceplates as shown in Fig. 26.

Now we will refer to Fig. 4, and will notice the above mentioned depression cam 20, at the right side of the molding head A, with the projecting prong of the plunger in the same relative position as in Fig. 21, and about to engage it, while the depression cam 20, does not engage the plungers in A' to break the adhesive seal of the wet mud and the excluded air from the mold in A' until after the egg is released from A.

The eggs may adhere to the ends of the plungers in either of the molding heads A' or A, as shown in such case they will be pushed off as shown in Fig. 4, by the left lower L shaped stripper 101 or the left upper L shaped stripper 103, from the plungers in molding head A' and will be pushed off the ends of the plungers in A, by the right lower L shaped stripper 102 or the right upper L shaped stripper 104. It is rare that the upper strippers are needed, but on occasions the eggs will stick to the lower strippers and roll under them and against the respective molding heads and will then be disengaged by the upper strippers.

These molding heads A, A' are turned by the shafts 19, 19' Fig. 2 which are kept in mesh by the gears 124 and 125, and turned by the gear 119. The molding heads are also kept in mesh and registration by means of the cogs and registering valleys in the hubs 3, 3 and 4, 4, shown in Figs. 19; 20; 21; 25; and 18.

In Fig. 21, is shown the rounded cogs 33 registering in mesh with the rounded valleys 34 which tend to separate the centers of the molding heads A', and A, so as to rise away from the apex of the high surface of the stud bars 1 as shown in Fig. 18 and in Fig. 25. The valleys 58 are provided to avoid pressure by the accumulating mud on the ends of the projecting sides or abutments 57 of the rounded valleys 34. The spur gear 119 is driven by the spur pinion 118 on the shaft 117 which is driven by the gear 116 which is driven by the spur pinion 115 on the shaft 114 which is turned by the belt pulley 27. The large spur gear 119 also turns spur pinion 120 which turns shaft 121 in unison with shaft 117, and these two shafts turn twelve times as the shafts 19' and 19 turn once, and the wrist pins 122 and 123 make one revolution for the passage of each stud bar in their respective molding heads A' and A and operate the oiling appliances J, for oiling the molds.

As shown in Fig. 4, the eggs K drop upon a yielding belt 24, operated by the driven and driving pulley 224 and have a short drop over the small pulley 225, upon the conveying belt 25.

In Sheet 4 in Figure 4 is a comprehensive front elevation in outline of the molding heads A', A; with the stripping members; the rotary cleaning brushes system I; the oiling system J; the lower rotary mixing system B; and the intermediate mixing system C.

Referring now to Sheet 5, Figures 5, 6, 7, 8, for detailed views of the rotary cleaning brushes I, the frames to which the parts 44 and 45, brackets, are attached are omitted from the views so as to show the parts beyond. The securing part is shown on the left side of Fig. 4, at 228, 229, 230, and on the right side at 231, 232; and the brackets for the lower ends of the depression bars 21 and 20 are shown in Fig. 4 at 234 and 233, respectively.

The rotary cleaning brushes 23, are mounted in pairs on small frames 226 and 227, the latter shown in Figs. 5, 7, and 8. Fig. 6, shows the motor belt passing over the grooved pulleys 37, 37 provided to operate the shafts 43, 43 upon which the brushes 23 are mounted. The driving belt 156 is round, but standard and other belts can be used. It crosses to give the brushes an opposite motion and to reduce friction in their contact. The shield 35 over the front of the brushes 23, is to prevent the brushed débris from escaping forward into the cleaned molds that are being oiled by the daubers 171 and 172, Fig. 4. The rotary brushes 23, are run at a high speed and dip into the molds at the time the molds are under their radius and rise out instantly, and are actuated in this dipping movement by the travelers or dollies 36, which drop into the recesses of the molds immediately following the molds to be cleansed. The dolly tongues 38 are longitudinally adjustable and are pivotally attached at the lower end to the brackets 44 at pivot 39, Fig. 8, and the upper end is secured to the axle 155, which carries the dolly wheels 36. The lifting pitman 40, is actuated at its lower end by the axle 155 and the dolly wheels 36, and at their upper end they actuate the frame 41 by pushing it backward and upward as it pivots at 42.

The short distance between the pivot 42 and the pitman 40 compared with the distance between pivot 42 and the brush 23 enables a slight rise of the axle 155 to cause a quick and greater rise of the brush 23 and causes it to dip and return quickly as the wheels 36 pass over the molds.

The oiling system J is shown in Fig. 4 and is comprised of a frame sliding uprightly on the two upright oil supply pipes 191 and 192, and actuated by the upright pitmen 163 and 164 which are in turn actuated by the wrist pins 123 and 122 respectively, mounted on the shafts 117 and 121 respectively shown in Fig. 2. These shafts turn twelve times while the molding heads turn once and the molding heads have twelve sets of molds in their respective surfaces, thus causing the oil daubers 171 and 172 to register with each set of molds.

The two upright pitmen 163 and 164 are pivoted at their top to their respective frames at 166 and 167 respectively, and the two pivotally supported frames are connected to each other at their back by the horizontally extending cross bars 194, and 193.

At the top of the rotary oil daubers 171 and 172, each has an oil cup 173 and 174 respectively with an upwardly flaring top opening that maintains a position under their respective oil supply faucets 175 and 176 and are positioned to catch the dripping oil from their respective faucets. The right rotary oil shaft 177 carrying dauber 171 revolves in the sleeve bearing 179 and is adjusted vertically by means of the right adjustable collar 181, and is turned by the universal joint member 184 which is operated by the right driving shaft 183 for oil dauber 171. Shaft 183 turns in sleeve bearing 187 and is actuated by grooved pulley 189 which is provided to be operated by a round driving belt.

The left rotary oil shaft 178 carrying oil dauber 172, turns in the left sleeve bearing 180, and is actuated by the left universal joint 185 and is adjustable vertically by means of the left adjustable oil collar 182. The left driving shaft 186 runs in the sleeve bearing 188, and is actuated by the left grooved pulley 190. The sleeve bearings 179, 180, 187 and 188 are held in their respective positions in the frames J by means of the clamping pressure of the frames 195, 196 and 197, 198, shown in Fig. 4.

Figure 3 is a right side elevation of part of the molding machine from the frame 206 to above the middle rotary mixers C. This figure shows the brackets 170 and 241 supporting pivotally the L shaped strippers 102 and 103, and shows the outwardly detouring curves made by the strippers to avoid the clamping frame 61 and the paddle shaftings 52 of the lower mixers. In this figure the mixing chambers of B and C are not housed in and are exposed to show the relative positions of the parts within. The curved paddles 51 and the curved paddles 63 are similar and the teeth 65, of the mixer C for stripping the mud from the paddles 63 are similar to teeth 50 for stripping the mud from the paddles 51 of mixer B.

The annular flange member 5, shown in Figs. 18, 19, 20 and 25, has a beveled convex surface and slopes toward the inner part of the molding heads A′ and A, so that the pressure of the mud against the inner walls of the faceplates 198 and 200, will tighten their lower edges upon the members 5 and tend to prevent the escape of the mud.

Figure 22 is a plan view in detail of the mixing appliance in B, as shown severed at line e—e of Fig. 21. In this figure is shown a section of the right jaw piece 48 and the left jaw piece 49. The sleeve coupling connections 141 are here shown with part of their centers removed to show the junction of the ends of the shaftings 52 and 140. The pins 158 are removably secured through the sleeve 141 and the shaft 52, by means of split keys or other keys as required. The removable feature of the shaft 52, is provided to more conveniently remove the paddles 51 when they become worn, and to replace them and harden them when replaced, as the abrasive mud soon wears them down thin.

In Fig. 26 is shown the oppositely positioned paddles 51, 51 adjacent to each other, but not touching and near the back face plate 198, going down side by side, and in Fig. 25, the pair of paddles 51, 51 are shown positioned to go down side by side. This arrangement is for the purpose of more forcibly depressing the mixture down between the two molding heads A′ A so as to fill the lower parts of the molds. Also in Fig. 25 is shown the bolts 59 and 60 supporting in place the jaw pieces 48 and 49 and the stripping teeth 50, and also the bolts 59 stay the faceplates 198 and 200 from spreading, while the bolts 60 secure the faceplate 198 and pass through the clamping frame 61 and press it against the face plate 200, as shown in Fig. 25. In the last named figure are shown the recesses 58 located on each side of each rounded cog 33, and provided to allow escape of débris from being pressed against by the projecting sides 57 of the rounded valleys 34.

In Fig. 3 is shown extending downward between the paddles 51, 51, the legs 157 of the tamper 53, and also the tamper lever 54 pivotally secured at its back end to the auxiliary upright post 218, and operated by the upright pitman 146. In Fig. 25, is shown how the said tamper lever 54, is secured to the tamper 53 by means of the bolt 55; and how the jaws 48 and 49 are secured to the side pieces 56.

In Fig. 1 the boxings 62 are shown secured to the clamping frame 61 which is represented made of angle bar, and in Fig. 3 it is shown made of a rectangular bar of wood, but they represent for the same purpose to support the outer ends of the paddle shaftings 52, and may be made either form.

Figures 1, 2 and 3, show an outline of the molding machine from three different views but not all of it in any one view.

In Figs. 4 and 16 are shown the disc ring 6, used on the end of the molding heads A′ A when we do not use the hub 4 shown in Figs. 1, 2, and 20, and in dotted lines in Fig. 19.

The back face plate 7 of the mixing case C, and the front face plate 239 of mixing case C, are shown in Figs. 3 and 4, and back plate 7 is also shown in Fig. 1.

The dust shield 35, shown in Figs. 4, 5, 6, 7, and 8, is to prevent the dust thrown out by the rotary brushes 23 in the frames I, from getting into the cleaned molds that are being oiled ready to receive the material to be molded. The bracket 231, Fig. 4, supporting bracket 45 on the right side of the figure is supposed to be supported by another metal support 228 similar to the one shown on the left side of the figure but is omitted to disclose the parts beyond.

Figure 2 shows a plan and Fig. 1 shows an elevation of part of the molding machine in which the stub axles 46 and 47, are shown extending outwardly from the outer hubs 4, and 47 turns in a boxing secured to the sliding frame M, and the other stub axle 46 turns in the bearing secured on the angle bar 108, and in line with the bearing secured on angle bar 109, and the bearing on bottom cross bar 209. The sliding frame M, has bolts passing down through it and through the members 108 and 109, and to keep the sliding frame M from binding on the members 108 and 109, thimbles surrounding the bolts are provided to press against plates 106, the underside of said frame M, and the top of the under slide bars 107, and said bolts pass through said thimbles 110, which are just long enough to prevent plates 106 and 107 from binding on 108 and 109. The flat base plate 111, is rigidly secured to and binds together the sliding members 106, 106 and it is the base upon which the clevis clamp 112 is rigidly secured.

In Figure 2, is shown a lever of the first class 22, in which the pivot bolt 166 represents the fulcrum and the compression pin 113 represents the weight and the actuating pitman 130 represents the power, to compress the molding head A′ against the molding head A. This pitman 130, is pivotally mounted on the end of the intermediary lever member 127 of the lever 22, at one end and upon the wrist pin 136 which actuates it at the other end.

In Figures 2 and 3 are shown the principal parts of the driving mechanism of the machine, omitting the line shafting and power producers which may be electrically driven or by steam or otherwise. In Figures 2 and 3, the belt pulley 27 drives the shaft 114 which drives the cog pinion 115, which in turn drives the spur wheel 116, which in turn operates the thick shaft 168, which turns the disc wheel 134 which carries the wrist pin 133, on which is mounted the friction roller 132, which drives the cam lever 131, operating the said wrist pin 136. The suspending swing bar 135, supports the swing end of the compression lever 22 at 127. This compression lever has a top and bottom member 126, shown partly removed to disclose the pivot pin 128, pivotally connecting the intermediary lever 127 is the top member and 126' is the said bottom member of 22, and they are both pivotally secured together and to 127 by the pivot connecting pin 128, and by the wooden safety pin 129, which is provided to be broken or cut by the shearing pressure in case some extra hard pressure be brought between the molding heads A and A', as if a piece of iron got between them. The small shaft 117 is an integral continuation and extension of the shaft 168 welded thereto but is smaller in diameter so as to pass through the small pinion 118 which turns and drives the large spur gear 119, which operates the molding heads.

In Figure 3, is shown the counter shaft 143, driven by the belt 145 on pulley 144 which is a drum pulley and also drives belts 147 and 148. Belt 147 drives pulley 149 rigidly secured to shaft 152, which directly drives paddle shaft or head 64 in the rotary mixer C. The cog pinion 150, turns with said shaft 152 and drives its mate cog pinion 151 which drives the mate to shaft 152 which drives the other paddle shaft 64, which carries the curved paddles 63 that pass between the stripping teeth 65.

The curved paddles 100, in the wet mixer D, are preferably of round material as they are intended for mixing only while the paddles in B may be required to be of flat or broad material as part of their mission will be to force the mixed material down between the molting heads A' and A.

The horizontal bar 202 shown in Figs. 2 and 3, is provided to receive the bar 203 from the nuts 204 and the pressure bolts 205. The bearings 201 resting upon the cross bar 217, support the middle of the shaftings 140 and 52.

The action of the friction roller 132 is similar to a toggle joint action and with the lever action of 22, occupies about one fourth of the time for one revolution of the disc wheel 134 shown in Fig. 3 and also one fourth of the time of the passing of one mold or one forty-eighth of the time of one revolution of the molding heads A' and A. It is desired to have as much time as possible for the filling of the molds, and as soon as the pressure of the roller 133, Fig. 27, is removed from the cam lever 131, the pitman 130 and the lever 127 are forced back by the spring 159, shown in Fig. 2, so as to provide for the quick opening between the molding heads A' and A, and this pressure of the spring 159 can be regulated by the adjusting screw bolt 161, and the long recoil spring 160, and its adjusting screw bolt 162. This spring 160 is to prevent too quick and too wide an opening of the space by spring 159. The clamping appliance 165, Fig. 2, is provided to secure the eyebolts 167 and the pivot bolt 166 to the notches in the compression lever 22.

In Fig. 3, is shown the pulley 149 that actuates the shaft 152 which drives the twin cog pinions 150 and 151, and the sleeve couplings 154 connecting the shaft 64 to them in C. In same figure 153 is the metal connection of lever 54 and its actuating pitman 146. The driving mechanism is to be above these parts and not shown. The sleeve couplings 141 are shown in Fig. 26 riveted to the shaftings 140 by the rivets 199, as a preferred construction.

In Fig. 2 is shown a part of the frame of the machine in which 206 and 207 are the right and left bottom longitudinal frame members, and 210 and 211 and the right and left front posts, respectively, and 208 is the bottom rear cross bar.

In Fig. 3, is shown the upright parts of the frame mentioned in which the middle upright post 212 is shown partly removed to disclose the mechanisms beyond and the upright post 214 near the rear of the frame and on the right side is shown also partly removed, for the same purpose. The cross bars 219 and 220, support the shaft 143, and the cross bars 216 and 217 support the shaftings 140. The cross bars 221 and 222 support the two shaftings 152 driving the mixing paddles in C, and the cross bar 223, supports the front end of the paddle shaftings 64 in C. In Fig. 2 are shown the two left side posts 213 and 215 corresponding to posts 212 and 214 in the right side and mentioned in Fig. 3.

In Fig. 1 and in Fig. 4 are shown the bolts 235 clamping together the face plate 239 and the back plate 7 near the top of the mixer chamber C, and in Fig. 1 are shown the bolts 237, that clamp together the face plate 200, and the back plate 198, shown in Figs. 3 and 26, and 238 are similar clamping bolts and shown in Figs. 1 and 4, in C, and the curved jaws 236, in Fig. 1 in mixer C, are integral with the stripping teeth 65, to strip the thickened mud from the paddles 63.

In Fig. 1 is shown the front side of the bracket 240 supporting the strippers 101 and 104 and the bracket 241 supporting the strippers 102 and 103, and 241 is also shown in Fig. 3 and is in connection with its mate 170. A bracket similar to 170 is presumed back of bracket 240, but is not shown as it is on the opposite side from 170. The curved sides 242, of mixer C, are shown in Figure 1 and in Fig. 23, and tend to confine the thicker mud and form part of the support for the integral jaws 236.

In Figure 27 the cam lever 131 is shown supported on the pivot pin 244 and supporting swing bar 135 is supported on the supporting pivot pin 243.

In Fig. 3, is shown the shut off gate 245, provided to shut off any surplus of damp mud from the mixing chamber C.

As heretofore suggested, the mixing of part of the mud or other mixture with a binding filament, as linters, is provided to be done in the mixing chamber D with a wet mixture so as to cause the filaments on the fiber of the linters to get wet with a solution of the sticky matter in the mud or mixture, as potash and then have the wet mixture pass down into the mixing chamber C where it will be re-mixed and with a supply of dry material there that may or may not contain dry linters or other fibrous binding material, and this mixture we designate as damp mud or damp mixture. The damp material or damp mixture is then released and falls to the mixing chamber B where it comes into contact with more dry material which may or may not contain fibrous binding material or other binding material. In the chamber B, the mixed material is much stiffer and has to be pressed down as it is re-mixed and therefore requires much power and strong machinery.

Figures 25 and 26 illustrate this machinery, in the mixing chamber B, in detail, and show the combination with the molding heads A' and A, which cover the principal mechanical part of my invention.

All the other mechanical parts of my invention are auxiliary to and secondary to these three elements, B and A' and A, with their special construction described in this application, in which Figures 9, 10, 11, 12, 13, 14, 15, 16, 17, 18, and 19, and 20, explain.

While the drawings illustrate a molding head provided to mold twelve pairs of nest eggs at one revolution in pairs of two eggs side by side and the twelve faces on each head having each the molds for two half eggs, I want it understood that I wish my invention to not be confined to this twelve faces or that the molds be in pairs only, but I desire to cover the use of my machine to make many eggs or molds in each face or to make but one egg or other article in each face and to have an indefinite number of faces in each head, as twelve or ten or twenty four.

Furthermore I wish my invention to cover the form of the stud bolts 28, not only swelled as shown at 29 in Fig. 17, but they may be supplied with bosses or lugs or smooth, as the exigencies may demand.

Further, in the mixing of medications into the dry material for disinfecting or deodorizing, or for odorizing purposes, I wish the right to mix them in the order in which they will mix compatibly, and of mixing them in either the dry or liquid form depending on the particular medicinal ingredients to be mixed.

In mixing into nest eggs or other articles the ingredient of sawdust it might be required to have more mixing chambers than the three illustrated in the drawings, and I therefore claim the right to use the number of mixers required, be it one mixer or an indefinite multiplicity of mixers.

In Fig. 4 is shown the molding heads A' and A, with twelve faces provided to mold two eggs in each face, and as shown in Fig. 19, there is no molding hub 4 on the front end of the molding heads A' and A, while Fig. 1 shows the molding head 4 on the molding heads, and Fig. 19 shows it attached in the dotted lines. Where we have a molding head with a plurality of egg molds or other molds in each face, it is necessary to sever the eggs or other articles apart as they drop from the molds, so that they will not act as a cluster and clog the conveyors 24 and 25. This is required for the reason, that the binder material if made of fiber, as linters, forms a thin strong compressed fin between the eggs and holds them together. So I have provided the severing wire 248 shown in Figs. 1 and 4, which is suspended directly under the line between the molds in the ends of the faces, and as the eggs drop one goes down on each side of the wire and severs the connecting fin between them. If they stick to the ends 15 of the plungers as shown in Figs. 4 and 21, the fin will be sawed or severed by the movement longitudinally with the wire.

This severing wire is shown suspended in Fig. 4 from two pins 249 and 250, and is in two positions, 248 and 251, the latter being the usual tight drawn position which could not be shown in Fig. 1 because of the interposition of the angle bar 108.

If we use a multiplicity of mold forms in one face we will use wires under the line between each two molds so as to sever the binding fin connecting the molded parts, as nest eggs.

Having thus described my invention I claim—

1. In a rotary machine of the class described adapted to mold articles of stiff plastic material; two rotating, molding heads with parts of the forming mold in opposite faces of the two heads as they register in contact, operating means to turn them, ejectors in each head provided to eject the molded article as the surfaces of the heads part, stripping members provided to detach the articles, and operative means for said ejectors.

2. In a rotary molding machine for forming plastic earthy matter, a pair of molding roller drums with a multiplicity of concave faces on the convex surface of each, each face consisting of the faces of stud bars and of the plungers alternately positioned forming recesses registering with recesses on the opposite drum, operative means for compressing said drums together, each plunger rigidly connected with a like plunger in the opposite side of its respective drum, and operated cam means actuating said plungers together so that one is moved outwardly as the other is moved inwardly, for the purpose specified.

3. A machine for molding nest-eggs and other articles from plastic earthy materials comprising a pair of rotatable molding heads operative plungers in each head actuated by cams to remove the molded articles from the molds, each mold formed from the surfaces of separately operated members in each head and registering with the opposite, a lever mechanism operating one of said heads from and against the opposite head to allow a supply of material to be fed between said heads when released and to be compressed into form by pressing said heads together, means for actuating said plungers to move at the proper times to expel said molded articles without defacing, stripping members provided to remove the molded forms from sticking to the plungers or heads, rotating brush members actuated to brush out and cleanse the said molds, actuating means for dipping said rotating brush members into said molds and for removing them from said molds as said heads rotate, rotating brushes provided with oil and operatively dipping into said molds immediately after they are cleansed, in combination with actuating means for operating said appliances synchronically.

4. In a machine of the class described for molding nest-eggs and other articles from plastic earthy materials, a pair of rotatable molding heads containing about half of the surfaces of the articles in the molds of each head, operative plungers in each head actuated by irregular cams to remove the molded articles from the molds, a lever mechanism operating one of said heads from and against the opposite head to allow a supply of material to be fed between said heads when released and to be compressed into form by pressing said heads together, means for actuating said plungers to move at the proper times to expel said molded articles without defacing, stripping members provided to remove the molded forms from sticking to the plungers or heads, rotating brush members actuated to brush out and cleanse the said molds, actuating means for dipping said rotating brush members into said molds and for removing them from said molds alternately as said heads rotate, rotating brushes provided with oil and operatively dipping into said molds immediately after they are cleansed, and actuating means for operating said appliances synchronically.

5. In a machine for molding articles of plastic material; two rotating molding heads with concavities in both heads registering opposite each other and provided to form the mold in the periphery of each head, two longitudinal bars forming part of the perimeter of each head and registering with two like bars in the opposite head, a plunger member operatively situated between each pair of said bars, and adapted to expel the formed molded article, lever actuating means for forcing one head away from its mate to allow the material to be forced down between the heads and fill the cavities of the molds, and to actuate said heads against each other.

6. In a molding machine of the class described, two rotatable molding heads, longitudinally extending bars in the face of the periphery of each head, a plunger member operatively situated between each two of said bars, each pair of bars and plunger being provided with a recess registering with a recess in the opposite pair of bars and plunger in the opposite head, each plunger being rigidly secured to a like plunger in the opposite pair of bars in the same head and operated therewith so that when the plungers in opposite heads are together their respective rigidly attached plungers project beyond the farthest separated peripheries of the heads, strippers actuatively positioned and adapted to remove the molded articles from said plungers, rotating brushes adapted and actuated to clean out said molds on the peripheries opposite the contact of the heads, and lever actuating means for separating said heads and for forcing them together synchronically, for the purposes specified.

7. In a molding machine of the class described adapted for forming articles from plastic materials, two rotating molding heads working against each other and being alternately separated and forced against each other, parallel extending bars forming part of the peripheries of each head, an operatively positioned plunger between each pair of two bars and the plungers in opposite sides of the same head being rigidly secured together so that one of them will project beyond the periphery and adapted to engage a cam to force its opposite plunger beyond the periphery to expel the molded article, each pair of bars and their within plunger having recesses to receive the material to be molded, said bars and plungers registering with like bars and plungers in the face of the opposite head, lever actuating means adapted to draw said heads apart and force them together alternately, stripping members adapted to strip the molded articles from the plungers, rotating brushes adapted to clean out said recesses as they are presented synchronically, and oiling members adapted to oil the cleaned recesses, automatically, for the purposes specified.

8. In a molding machine of the class described, the combination of two molding heads, lever actuating means for forcing said heads apart and together alternately and synchronically, rotating pressure paddles adapted to force the plastic material to be molded to between said heads, rotating brushes adapted to cleanse said heads, rotating means for oiling said heads after being cleaned, actuating means for driving said heads, levers, brushes, paddles, and oilers, means synchronizing with said lever adapted to remove said brushes from the heads and to drop them into the empty molds; said heads being provided with recesses in their peripheries registering in the opposite contacts of the heads and adapted to receive plastic material to be molded, plungers situated in each head adapted to expel the molded articles, stripping members adapted to remove the molded articles from said plungers, and cam members adapted to operate said plungers synchronically, for the purposes specified.

9. In a molding machine of the class described, a pair of molding heads rotating against each other in opposite directions, lever actuating means for forcing said heads apart and against each other as they are rotated, rotating pressure paddles adapted to force plastic material down between said heads as they are parted, said heads having recesses in their contact peripheries adapted to receive said material to be molded into said recesses under pressure, plunger members extending transversely through said heads and adapted to expel the molded articles from said recesses, stripping members adapted to remove said articles from said plungers below said heads, rotating brushes mounted in frames and adapted to dip into said recesses and clean them, rotating oiling members adapted to oil said recesses after they are cleaned, lever members adapted to operate the dip of said frames and oiling members synchronically as the recesses pass under said brushes, and cam members adapted to operate said plungers.

10. In a molding machine of the class described, in combination, a mixing chamber adapted to receive dry pulverized material and a humid liquid, rotating mixing paddles in said chamber adapted to mix said material and liquid, rotating molding heads situated below said chamber and provided with recesses in their peripheries adapted to receive said material and liquid as a plastic composition, rotating pressure paddles in a secondary chamber below said mixing chamber and above said heads adapted to force said composition into said recesses, actuating means to operate said mixing paddles, pressure paddles, and heads, lever actuating means adapted to force said heads apart and together to allow said recesses to fill with said composition and to be pressed therein, cam actuated plunger members extending transversely through said heads and adapted to expel the molded articles of composition from said recesses, rotating brushes mounted on frames and adapted to dip into said recesses to clean them as they pass, stripping members adapted to remove the molded articles from said plungers, rotating members adapted to oil said recesses after they have been cleaned, and actuating means adapted to synchronically operate said frames and brushes and rotating members with said heads.

11. In a molding machine adapted to mold definite forms as artificial nest-eggs from plastic material, in combination, a primary mixing chamber adapted to receive dry pulverized material and a fluid material to be mixed into a composition, rotating mixing paddles operating in said chamber, a receptacle beneath said chamber and adapted to receive said composition, a hand operated shutoff valve-slide between said chamber and receptacle, a pair of molding heads beneath said receptacle rotating against each other in opposite directions, lever actuating means provided and adapted to draw said heads apart and to force them together alternately as they revolve, rotating pressure paddles operating within said receptacle close above said heads and adapted to force said composition down between said heads as they are apart, and said heads having molding recesses in their respective peripheries adapted to receive said composition to be molded, plunger members extending transversely through said heads and adapted to expel said artificial nest-eggs or other forms from said recesses, rotating brushes mounted in dipping frames and adapted to dip into said recesses and clean them of débris, rotating oiler members adapted to dip into said recesses and oil them after they have been cleaned, abutments adapted to engage the outwardly extending plunger end and force it inwardly and thus force the mate of said plunger to expel the egg on the opposite side of said head, spring-compressed stripping members adapted to strip said molded articles from said plungers beneath said heads, actuating means operating said dipping frames so as to synchronize with the rotating of said heads so that said brushes will dip into said recesses, and actuating means adapted to operate said parts in combination as herein set forth, for the purposes specified.

12. In a molding machine adapted to mold definite forms as artificial nest-eggs from plastic or semiplastic material, in combination, a mixing chamber adapted to receive dry pulverized material and a fluid material to be mixed into a composition, rotating mixing paddles operated in said chamber and adapted to mix said articles into a plastic composition, a receptacle beneath said chamber and adapted to receive said composition from the bottom of said chamber, a shut-off valve-slide forming the bottom of said chamber and adapted to release the contents of said chamber to drop into said receptacle as desired, a pair of molding heads positioned beneath said receptacle and rotating against each other in opposite directions, lever actuating means adapted to draw said heads apart to allow said composition to be received between them and then to force said heads against each other with great pressure alternately as they rotate, said heads having recesses in their respective peripheries registering with each other and adapted to receive said composition to be molded into definite forms, rotating pressure paddles rotating within said receptacle close above said heads and adapted to force said composition down between said heads as they part and being bent for a wiping effect so as to present a backwardly sloping pressure front adapted to have the said composition to wipe off of the paddles, molding bars and plungers forming the peripheries of said molding parts of said heads and said plungers and bars being positioned alternately in said periphery of each head so that a plunger operates between each two bars and said plungers are rigidly connected in pairs extending through said respective heads so that when one plunger is positioned against the opposite head its connected plunger protrudes about one half inch beyond the opposite side of the head and is adapted to engage a cam bar in its upward and inward path and to be forced inwardly toward the center of said head so as to force its opposite connected mate outwardly as it descends and parts from the opposite head for the purpose of expelling the molded forms from contact with said bars, spring actuated stripper members pressed against said peripheries and adapted to strip said forms from the contact with said plungers as they pass and rising from the under side of said heads, dipping frames positioned diagonally above and to the far outer side from said heads and pivoted at their ends farthest from their respective heads and with the nearer ends of said frames free to rise and fall, rotating brushes mounted on said frames and positioned at their free ends and adapted to dip into the recesses of said molds in said heads and adapted to clean them of débris, actuating means adapted to lift and lower the free ends of said frames to dip said brushes into said recesses and synchronize with said molds and heads, oiling members adapted to oil said recesses after they are cleaned and before they again enter under said receptacle to receive said composition to be molded, and actuating means for the purpose specified and adapted to operate said combination of mechanisms synchronically.

13. In a rotary molding machine of the class described adapted to form definite forms of plastic material as forming artificial nest-eggs, the following combination; a pair of molding heads rotating against each other in opposite directions and having a multiplicity of recesses in their peripheries registering in contact of the heads, lever actuating means adapted to draw said heads apart to receive said material and to force them together to compress the said forms, stud bars and plungers alternately positioned forming the molding periphery of said heads, the two opposite plungers in each head being rigidly secured together so that one is forced out to expel the said form from the bars as its opposite mate plunger is forced inwardly by contact with a provided cam member from above, stripping members actuated against the under and outer part of the periphery of each head adapted to strip the molded forms from said plungers as they pass said strippers, and actuating means for operating said combination synchronically.

14. A rotary molding machine of the class described adapted to mold definite form from a plastic material as clay; comprising two molding heads rotating in opposite directions and having recesses in their respective peripheries registering with the recesses in the opposite head, actuating means adapted to draw said heads apart to receive said material between them and to force them against each other as said recesses register, means provided for and adapted for removing said definite forms from said heads and for cleaning said recesses and for oiling them, substantially as set forth.

15. In a rotary molding machine of the class described, the combination of two molding heads with irregular peripheries rotating against each other in opposite directions, of means provided for forcing said heads apart to receive the material to be molded and for forcing said heads against each other alternately, as they revolve, so as to synchronize with the molds in said heads.

16. In a molding machine for forming plastic material, the combination of a pair of molding heads rotating against each other in opposite directions and actuating means for alternately forcing said heads apart to allow the material to be forced between the heads and then against each other to squeeze the material into the molds in the faces of said heads as the heads rotate synchronically, and means for driving the combination.

17. In a molding machine of the class described, the combination of a pair of molding heads rotating in opposite directions with parts of the mold in the peripheral faces of each head, and means adapted to force them apart and to force them together alternately to synchronize with the registering of the molds in the two faces, and with actuating means for the combined parts.

18. In combination, a supply mixing chamber and mixing apparatus, a receptacle below it and pressure paddles in the receptacle, two molding heads under said receptacle and having pockets registering in their adjacent peripheries, twin plungers secured to act together rigidly and extending through said heads and each forming part of the wall of its respective pocket and constructed longer than the perimeter of the heads so that the plungers on the opposite face of the heads from their contact project to engage a provided abutment, members adapted to strip the molded articles from the plungers, dipping brushes adapted to clean said pockets and oil them, and actuating means for said combination of parts.

19. In a molding machine adapted to form articles from plastic earthy matter; a pair of rotatable molding heads adapted to rotate in opposite directions, means for drawing them apart and forcing them together, said heads having cavities in their peripheries registering with cavities in the opposite head, pressure means for forcing said matter down between said heads, plunger members in said peripheries and actuating means to force said plunger members to project from said peripheries to expel the formed articles and to recede into said heads, stripping members adapted to strip said articles from said plunger members and from said heads, means for cleaning said cavities while empty and means for oiling the cavities when cleaned.

20. In a molding machine of the class described, a mixing chamber, rotating mixing paddles in said chamber adapted to mix the ingredients to be molded and having the pressure front faces of said paddles sloping backwardly and adapted to clear said mixture from said faces by a wiping action, pressure paddles positioned in a recess member below said mixing chamber and close above two rotating molding heads, backwardly extending front faces on said pressure paddles adapted to wipe said mixture from said paddles and press it down between said heads, stripping members secured to the sides of said recess member and positioned between said pressure paddles and adapted to scrape said ingredients from the sides of said pressure paddles as they pass, means provided for moving said heads apart and together as they rotate, recesses registering in the opposite peripheral faces of said heads to receive said ingredients, and synchronical actuating means.

21. In a molding machine of the class described adapted to form articles from plastic earthy matter; two molding heads rotating in opposite directions against each other and having recesses in their peripheral faces registering with their opposite faces and adapted to receive the earthy matter to be molded, sets of pressure paddles close above said heads and adapted to force said matter down between said heads as their adjacent faces turn downwardly, plunger members forming parts of the deepest parts of said recesses and adapted to be forced outwardly from the periphery of said heads to effect the expulsion of the articles from said recesses, means provided for cleaning and oiling said recesses after said expulsion and before being refilled, lever means adapted for drawing said heads apart and compressing them together for each set of recesses, and actuating power means for synchronically operating said members, substantially as set forth.

22. In a molding machine of the class described, adapted to form articles, as nest eggs, from plastic earthy matter; two molding heads rotating in opposite directions against each other, cog-shaped teeth on each of said heads fitting into recesses on the peripheral faces of the opposite heads and adapted to cause said heads to register when forced together at definite parts of said faces, said peripheral faces having deep recesses beside said teeth adapted to receive said matter to be formed into articles, lever means adapted to draw said heads apart and to force them together alternately for each set of said recesses, pressure means for forcing said matter down between said heads as they operate their adjacent faces downwardly, plunger members extending radially from the bottom of each of said recesses and adapted to force said articles from said recesses, means for cleaning and oiling said recesses, and means for synchronically operating said parts.

23. In a molding machine of the class described adapted for molding articles from plastic earthy matter, the combination comprising a pair of molding heads with the same number of flat faces and rotating together in opposite directions, means for forcing said heads apart and together alternately so that said faces shall meet flatly and evenly in the opposite heads, said faces having recesses in them registering in the opposite faces adapted to receive said earthy matter as the heads are separated and be forced together while the recesses are full, a plunger member in each of said recesses, forming part of said heads and forming part of the recess for molding, hub members on each end of each head, stud bars extending parallel to and between each two of said plungers and said bars each forming part of the recess of said molds, bolt members extending through said hub members and longitudinally through said bars and adapted to secure each of said heads together, an annular boss on the presented faces of each pair of hub members adapted as a rest for said bars and said plungers when on pressure, means for operating said plungers to expel the articles after being molded, pressure-paddle means for forcing said earthy matter to between said molds while separated and means for supplying said earthy matter to said pressure-paddle means, means for cleaning said mold recesses and for oiling them, and means for stripping said molded articles from said plungers, substantially as set forth.

24. In a molding machine of the class described, the combination comprising two molding heads rotating together in opposite directions and having the same number of flat parallel faces in their peripheries and containing recesses adapted to register with their opposite faces to mold articles from plastic earthy matter, actuating means adapted for forcing said heads apart and together alternately, hubs at each end of each head, parallel bars extending between the adjacent sides of said hubs, bolts extending through said hubs and longitudinally through said bars, plungers operatively situated between each two of said bars and said bars and plungers each adapted to form part of the recess and part of the periphery and said plungers adapted to expel the formed articles, an annular projecting flange on the inner side of each of said hubs adapted as a rest for said bars and said plungers when on pressure, cog-teeth means mounted rigidly on a shaft with said heads adapted to cause them to turn synchronically and adapted to cause said faces and molds to register, means adapted to force earthy matter between said molds while parted and means for operating said plungers to expel the molded articles from said recess in the periphery of said heads as they part, and means for cleaning and oiling said molds as they rotate, substantially as set forth.

25. A machine for molding articles, as nest-eggs, from pulverized earthy matter, comprising a pair of rotatable molding heads having recesses in their peripheral faces registering with their opposite faces adapted to form said articles, plungers in each head and having actuating means adapted to remove the molded articles from said recesses, lever-actuating-means adapted to force said heads apart and to compress them together alternately, a cam-movement appliance operating said lever-actuating-means adapted to cause said heads to separate more quickly than to go together, a spring actuating member adapted to separate said heads quickly when released from said cam-movement appliance, and means for feeding said matter to between said heads as they are separated, substantially as set forth.

JOHN F. MULLANEY.